Patented Sept. 28, 1943

2,330,263

UNITED STATES PATENT OFFICE 2,330,263

ESTERIFICATION OF HYDROXYALKYL CELLULOSES

Aubrey E. Broderick, South Charleston, W. Va., assignor to Carbide and Carbon Chemicals Corporation, a corporation of New York No Drawing. Application September 10, 1940, Serial No. 356,183

18 Claims. (Cl. 260—226)

The present invention relates to the production of primary organic acid esters of cellulose ethers; and more especially it concerns a novel process for pretreating hydroxyalkyl celluloses preparatory to and in conjunction with the esterification of such ethers, whereby the esterification proceeds at a practicable rate and with a minimum expense for recovery and regeneration of the esterification medium and other organic liquids employed.

The invention has especial utility for the preperation of primary esters of hydroxyalkyl celluloses in the fibrous state, utilizing the well-known non-solvent type of esterification procedure, such as that described in my pending application Serial No. 305,104, filed November 18, 1939, eliminating the necessity for using an organic acid pretreatment of the hydroxyalkyl cellulose, and reducing the quantity of non-solvent later required during esterification for maintaining the esters in the fibrous state. Among the more important objects of the invention are: to provide for reducing the amount of non-solvent diluents required in preparing fibrous-type primary esters of hydroxyalkyl celluloses; to provide in novel manner for reducing the tendency for objectionable degradation of the cellulose macromolecule by acetolysis under action of acetic acid and an acid catalyst; and to eliminate the use of organic acids such as acetic acid in the fibrous esterification of hydroxyalkyl celluloses. These and other objects will be obvious as the following description of the invention proceeds.

According to the invention, an hydroxyalkyl cellulose, such as an hydroxyethyl or hydroxypropyl cellulose, such as those prepared in the general manner hereinafter described, and freed from water soluble constituents, is preferably dried to a moisture content of not substantially more than 3%. The dry hydroxyalkyl cellulose is then intimately mixed with or steeped in at least a portion of the organic acid anhydride, or mixture of such anhydrides, subsequently to be used in its esterification. Among acid anhydrides suitable for use are acetic, propionic and butyric anhydrides, and mixtures of two or more of such anhydrides. It usually is convenient to employ at this stage an amount by weight of organic acid anhydride at least equivalent to the weight of the hydroxyalkyl cellulose being pretreated, in order to facilitate uniform dispersion of the anhydride throughout the mass of the said cellulose ether.

Such treatment is conducted in the substantial absence of added water, and usually extends over a period of three to four hours, with agitation, although a longer period of treatment may be employed. The time necessary will depend upon the state of subdivision of the hydroxyalkyl cellulose, and upon the molecular weight of the particular organic acid anhydride employed, the steeping period increasing in length with the increase in molecular weight of the acid anhydride. The temperature of the mixture during this pretreatment with the organic acid anhydride preferably is maintained within the range between 20° and 35° C., although higher and lower temperatures may readily be employed without injury to the product. Temperatures of 60° C. have been satisfactorily employed.

For the subsequent esterification, a suitable esterification catalyst is introduced into the mixture from the pretreating step, the said catalyst being introduced either in dispersion in any additional organic acid anhydride to be used in the esterification step, or in an inert liquid diluent, or in a mixture of both such acid anhydride and a diluent, while agitating the resultant mixture, and cooling if necessary to prevent undue temperature rise. Preferably the esterification is conducted at a temperature within the range from around 20° C. to around 35° C., though higher temperatures upwards of 60° C. may be used. The total amount of organic acid anhydride employed generally is equivalent to approximately 4.5 mols of each glucose anhydride unit represented by the hydroxyalkyl cellulose. Larger quantities of anhydride may of course be used; and sometimes lesser amounts provide satisfactory results.

When the esterification is conducted in the presence of an inert liquid diluent for the reactants, such diluent may be either a solvent or a non-solvent for the resultant primary ester of the hydroxyalkyl cellulose, depending upon whether or not it is desired to produce a product retaining the original fibrous character of the cellulose, or whether the final product is desired in the form of a liquid or "dope." In the preferred practice of the invention, however, primary esters retaining the fibrous structure of the original hydroxyalkyl cellulose are produced in a form permitting ready separation from the liquid portion of the reaction mixture by the simple expedients of filtration and washing. Such procedure for the separation and purification of the ester is much simpler than in the case where the "dope" procedure is used; and the former results in a highly efficient recovery of any unreacted organic acid anhydride from the reaction mixture. The fibrous primary ester of hydroxyalkyl cellulose produced by the process is well adapted for partial hydrolysis by the process described in my aforesaid copending application Serial No. 305,104, to yield products readily convertible to rayon yarn of superior tensile strength and elongation.

It is generally preferred—when preparing by the non-solvent method primary acetate esters of hydroxyalkyl celluloses derived from cotton linters—to employ isopropyl acetate as the non-solvent diluent in amount around 1.2 to 1.75 times the weight of the acetic anhydride employed. Diethyl ether may be used alone as the non-solvent diluent in the acetylation of hydroxyethyl and hydroxypropyl celluloses. Considerably less diethyl ether than of isopropyl acetate is required as diluent per unit of acetic anhydride. In some instances, as when treating hydroxyalkyl celluloses made from certain wood pulps, it is desirable to substitute an alkyl ether, such as a diethyl ether or diisopropyl ether, for an equivalent amount, say 10% to 20%, of the isopropyl acetate. The latter procedure also is utilized when producing mixed esters of hydroxyalkyl celluloses, such as the acetate-propionate and the acetate-butyrate. In the case of primary esters of the higher molecular weight organic acids containing only one type of combined acyl group, aliphatic ethers of relatively high molecular weight such as di-n-butyl ether, are preferably used as non-solvents in those instances where a fibrous structure in the resultant product is desired.

Among suitable esterification catalysts found useful in the invention may be mentioned mineral acids, such as hydrochloric, perchloric, sulfuric, and phosphoric acids, and various combinations thereof. Sulfuric acid preferably is employed since it facilitates control of the esterification speed. When employing the non-solvent type of esterification procedure, catalysts may be employed which do not tend to hydrolyze the primary esters, such as sodium and potassium acetates, ferric chloride and other metallic chlorides.

When the esterification reaction is complete, the primary ester is separated from the reaction mixture by means of the particular non-solvent used in the reaction. If desired, a portion of the recovered reaction mixture may be reused in a subsequent reaction. The extracted fibrous primary ester is then treated with hot water or steam to remove the remaining non-solvent by distillation, is stabilized and dried, or somewhat reduced in moisture content, and is hydrolyzed to a corresponding secondary ester in accordance with the procedure described in my aforesaid application Serial No. 305,104. If desired, the non-solvent may be extracted from the reaction mixture with an alcohol, such as ethyl alcohol, the primary ester, wet with the alcohol, then being hydrolyzed in accordance with the procedure described in the aforesaid copending application. The primary ester of hydroxyalkyl cellulose, when isolated and used as such for suitable industrial purposes, is stabilized by boiling for several hours in a dilute (e. g. 0.1%) solution of sulfuric acid, followed by several extractions of the mixture with boiling water until the product has satisfactory heat- and light-stability.

The process of the invention is especially adapted for the esterification of hydroxyalkyl celluloses derived from unmercerized cellulose or derivatives thereof substantially free from alkali cellulose, and which have been reacted with between around 1% and 30% of their weight of an alkylene oxide, such as ethylene oxide, propylene oxide, etc., or mixtures thereof. Particularly suitable as starting materials are hydroxyalkyl celluloses prepared from purified cotton linters, from wood pulp of high alpha cellulose content, or from the viscose rayon grade of sulfite wood pulp, by the procedure described in the A. E. Broderick United States Patent No. 2,173,471, which products have been freed from water-soluble constituents, and dried to a moisture content around 3% or less.

However, it is readily possible to utilize in the process hydroxyalkyl celluloses of similar derivation and having alkylene oxide contents far in excess of 30% of the weight of the cellulose, although the resultant products are distinctly less stable toward heat than those derived from ethers of lower hydroxyalkyl content. Suitable highly hydroxy-alkylated celluloses may be produced in well-known manner, such as that described in German Patent No. 363,192 of Bayer and Co. It is preferred to use a relatively weak organic base such as dimethyl aniline as catalyst in the production of hydroxyethyl celluloses; while a strong organic base such as dimethyl dibenzyl ammonium hydroxide is usually employed in reacting propylene oxide with unmercerized cellulose, which reaction demands a more active catalyst.

The following examples are submitted merely for the purpose of illustrating the invention; and the latter is in no sense regarded as limited thereby.

*Example 1*

7500 grams of cotton linters containing 7% of moisture were treated with 10,615 grams of water containing 75 grams of caustic soda; and the resultant mixture was shredded for 2.5 hours, and then reacted in an autoclave, at temperatures around 45° C., with 1238 grams of ethylene oxide vapor over a period of seven hours, while under a pressure of 27.7 inches of mercury, absolute. Hydroxyethyl cellulose was thus produced, in accordance with the procedure described in my United States Patent No. 2,173,471 and involved the reaction of 16.5 parts by weight of ethylene oxide and 100 parts of the linters.

To 3978 grams of this hydroxyethyl cellulose, dried to a moisture content of 2.09%, 11,100 grams of 98% acetic anhydride, were added and intimately mixed, and allowed to stand at room temperature overnight. To this mixture were then added 16,750 grams of isopropyl acetate in which 47.5 cc. of 95% sulfuric acid had been dispersed. After agitation for 24 hours, while preventing temperature rise above 35° C., the acetylation was complete. The resultant ester had good solubility in a mixture of 90% methylene dichloride and 10% ethanol, by volume. The fibrous primary acetate of hydroxyethyl cellulose was separated from the reaction mixture by filtration, and was rinsed free of acetic acid and acetic anhydride with isopropyl acetate. Isopropyl acetate was then removed from the mixture by rinsing with methanol. The alcohol-wet material was employed in the preparation of the secondary acetate ester derivative of the character, and by the procedure described in my aforesaid application.

*Example 2*

An hydroxyethyl cellulose prepared from cotton linters in the manner described in Example 1, was dried to a moisture content of 2.17%. To 51.1 grams thereof were added 114 grams of 98% acetic anhydride and 36.3 grams of 98% propionic anhydride. The mixture was allowed to set for eight hours at room temperature. Esterification then was effected by the addition of 0.75 cc. of sulfuric acid in 244 cc. of isopropyl acetate. Twenty-six cc. of isopropyl ether were added to prevent dissolution of the relatively soluble mixed acid ester in the esterification mixture. The fibrous character of the original hydroxyethyl cellulose was retained in the resultant primary mixed acid ester thereof. Complete solubility of the ester in methylene chloride-ethyl alcohol (90:10 by volume) was secured in 21 hours.

*Example 3*

25 grams of the hydroxyethyl cellulose described in Example 1, were pretreated overnight at room temperature with 91.2 grams of 98% propionic anhydride. To this mixture were then added 200 cc. of anhydrous dioxane containing 0.37 cc. of 95% sulfuric acid, while maintaining the temperature at or below 35° C. After 48 hours, a clear dope or solution of the primary propionic ester of hydroxyethyl cellulose was obtained. The latter was precipitated with water, purified and dried. The fibrous type of primary ester may be obtained by substituting in the process, for all or part of the dioxane, an aliphatic ether such as diethyl, diisopropyl, or dibutyl ether.

*Example 4*

Hydroxypropyl cellulose was prepared by reacting 8.51 kg. of cotton linters containing around 6% of moisture with 11.41 kg. of water containing 0.08 kg. of caustic soda, and reacting the resultant mixture with 1.74 kg. of propylene oxide, for 8 hours at 55° C. in the manner described in my United States Patent No. 2,173,471; and the product was dried to a moisture content of 2.05%. Using the procedure described in example 1, 4.09 kg. of the hydroxypropyl cellulose were pretreated with 13.8 kg. of 98% acetic anhydride. In the subsequent acetylation, a mixture of 20.8 kg. of isopropyl acetate and 48.9 cc. of 95% sulfuric acid was added to the mixture from the pretreatment. The resultant fibrous primary acetate ester of hydroxypropyl cellulose was separated and purified in the general manner described in Example 1. This product was generally similar to that produced in Example 1, but had a higher moisture resistance than the latter, when used as a molding material.

The following example illustrates a procedure in applying the invention to the production of primary organic acid esters of highly hydroxyalkylated unmercerized cellulose, i. e. to the treatment of those hydroxyalkyl celluloses having combined alkylene oxide contents of more than 30% of the weight of the cellulose.

*Example 5*

To 2884 grams of a hydroxypropyl cellulose hereinafter described were added 9160 grams of 98% acetic anhydride. After steeping overnight at room temperature, a mixture of 30 cc. of 95% sulfuric acid in 11,470 grams of diethyl ether was added, and the mixture was agitated, while maintaining a temperature near but below 35° C. After 24 hours the product was completely acetylated, being soluble in a mixture of methylene dichloride and ethanol (90:10 by volume). The reaction mixture was washed with isopropyl ether, centrifuged, extracted with isopropanol, and finally extracted with cold methanol. The resultant fibrous primary acetate ester had a combined acetic acid content of 50%; and a ratio of cellulose to propylene oxide content of 100:44.

The hydroxypropyl cellulose employed in this example was prepared by reacting 2000 grams of cotton linters containing 5.13% moisture, with a mixture of 30 liters of propylene oxide and 100 grams dimethyl dibenzyl ammonium hydroxide at 99°–100° C. for 12 hours. The resultant hydroxypropyl cellulose was purified in well-known manner, as described in my aforesaid United States Patent 2,173,471.

1820 grams of the primary acetate ester—produced by the aforesaid esterification—wet with 1967 grams of methanol, were dissolved in 6550 cc. of ethylene dichloride by heating at 60° C. A mixture of 365 cc. distilled water and 107 cc. methanol was added, and the solution heated at 100° C. for 8 hours in an autoclave. The resultant secondary ester was separated from the solvents by evaporation of the latter in boiling water, was purified, and dried at 70° C., to yield an acetone-soluble secondary acetate of hydroxypropyl cellulose having a combined acetic acid content of 47.9%, and a ratio of cellulose to propylene oxide of 100:44.

*Example 6*

Using the procedure set forth in Example 5, 2000 grams of cotton linters containing 5.1% of moisture were reacted with a large stoichiometric excess of liquid ethylene oxide containing 25 grams of dimethyl aniline. To 2459 grams of the resultant hydroxyethyl cellulose, containing 2.6% moisture, were added 7869 cc. of acetic anhydride. After steeping overnight, a mixture of 24.6 cc. of 95% sulfuric acid in 9870 grams of diethyl ether was added, and the resultant mixture was agitated at temperatures between atmospheric and 35° C. for 24 hours. 1786 grams of the resultant fibrous primary acetate of hydroxyethyl cellulose were dissolved in 1409 cc. of methanol and 6430 cc. of ethylene dichloride, and hydrolyzed with 358 cc. water and 928 cc. of methanol, in the manner described in Example 5, yielding a secondary acetate derivative soluble in acetone, and having a combined acetic acid content of 48%, and a ratio of cellulose to ethylene oxide of 100:27.

When employing as starting materials hydroxyalkyl cellulose containing a ratio of alkylene oxide to original cellulose content of over 25:100 by weight, the aliphatic ethers, such as diethyl ether, preferably are employed as non-solvents, since isopropyl acetate, mixed with acetic acid and acetic anhydride, is a solvent for the primary acetates of the more highly hydroxyalkylated cellulose, whereas the aliphatic ethers prevent solution of these primary esters. The hydrolysis of the more highly hydroxyalkylated primary organic acid esters may be accomplished in the same manner as in the case of the lower hydroxyalkylated primary esters.

The hydroxyalkylated celluloses of the present invention may be prepared from a wide variety of cellulosic materials, such as purified and unpurified cotton linters, wood pulps high in alpha cellulose, and viscose rayon grades of sulfite wood pulp, by procedures hereinbefore described, and those set forth in my United States Patents Nos.

2,173,470 and 2,173,471, the cellulose ethers thus prepared being extracted in well-known manner until free from water-soluble constituents and impurities, and then dried to a moisture content around 3% or less.

As already indicated, the primary organic acid esters of hydroxyalkyl celluloses produced in accordance with the present invention are well adapted for conversion to the corresponding secondary esters having properties rendering them especially efficacious for the production of plastics and rayon yarn. Those secondary esters derived from the fibrous type of primary esters are especially suitable for conversion to rayon yarn having tensile strength and elongation superior to present-day commercial acetate yarn.

The present invention has made possible the production of valuable acetate ester derivatives of hydroxyalkyl celluloses by an esterification procedure dispensing with any pretreatment with acetic acid or other organic acid acting as a solvent for the primary ester and necessitating recovery of the latter by precipitation with water. Such water treatment, in turn, converts any acetic anhydride to acetic acid and then dilutes the latter, making the recovery of acetic anhydride for further use in the process an expensive necessity.

The present invention has the further advantage that—as acetic acid is not introduced at any stage of the process—the amount of non-solvent employed can be reduced to a minimum since, in cases where acetic acid is used, it is necessary to use from 1.2 to 1.75 parts by weight of isopropyl acetate for each part of acetic acid employed, or from 0.6 part to 0.8 part by weight of diethyl ether. Thus the volume of the mixture being processed is reduced by around 2.2 pounds or more of non-solvent diluent and acetic acid for each pound of acetic acid eliminated. Another advantage of the process lies in the reduced likelihood of objectionable degradation of the original cellulose macromolecule by acetolysis. Acetolysis is a reaction involving the splitting of anhydroglucose units from one another to form cellobiose octoacetate; and is effected by means of acetic acid and a mineral acid catalyst. In all previously known procedures for acetylation, the likelihood of this occurring is indicated by the fact that a water-soluble cellulose ester fraction is formed. Apparently the formation of such a fraction by the present procedure, applied to the hydroxyalkyl celluloses of lower hydroxyalkyl content, is practically non-existent, since partially acetylated hydroxyalkyl cellulose is formed before any substantial amount of acetic acid is available; and the partially acetylated materials are much more stable to acetolysis than the unacetylated material. This is also true with respect to the esters of the organic acids and mixed organic acids of higher molecular weight, such as those hereinbefore named.

The invention is susceptible of modification within the scope of the appended claims.

I claim:

1. Process for producing a fatty acid ester of an hydroxyalkyl cellulose, which comprises pretreating a dry hydroxyalkyl cellulose, derived from unmercerized cellulose, with a lower fatty acid anhydride, in the absence of an added esterification catalyst, reacting the resultant mixture with an esterifying bath containing an esterification catalyst and a lower fatty acid anhydride, and separating from the reaction mixture the ester thus produced.

2. Process for producing a fatty acid ester of an hydroxyalkyl cellulose, which comprises pretreating a dry hydroxyalkyl cellulose, derived from unmercerized cellulose, with a lower fatty acid anhydride, in the absence of an added esterification catalyst, reacting the resultant mixture with an esterifying bath containing a lower fatty acid anhydride and a mineral acid catalyst dispersed in an inert organic diluent, said diluent being present in such amount that said bath does not dissolve the primary ester of a hydroxyalkyl cellulose thus produced, and separating the said ester from the reaction mixture.

3. Process as defined in claim 2 wherein said organic diluent is a non-solvent for the primary ester produced, and is a lower aliphatic acetate.

4. Process as defined in claim 2 wherein said organic diluent is an alkyl ether having at least four carbon atoms.

5. Process for producing a fatty acid ester of an hydroxylalkyl celllulose in fibrous form, which comprises pretreating with a lower fatty acid anhydride, in the absence of an added esterification catalyst, a hydroxyalkyl cellulose, prepared by reacting an unmercerized cellulose with an alkylene oxide and having an alkylene oxide content of at least 7% based on the weight of the cellulose, thereafter reacting the resultant mixture with an esterifying bath containing an acid esterification catalyst, a lower fatty acid anhydride and an inert organic diluent which is a non-solvent for the primary fatty acid ester of a hydroxyalkyl cellulose thus produced, said inert diluent being present in an amount such that the bath does not dissolve said primary ester, and separating said ester from the reaction mixture.

6. Process for producing a fatty acid ester of an hydroxyalkyl cellulose in fibrous form, which comprises preheating with a lower fatty acid anhydride, in the absence of an added esterification catalyst, a hydroxyalkyl cellulose, prepared by reacting an unmercerized cellulose with an alkylene oxide and having an alkylene oxide content within the range from around 7% to around 30%, based on the weight of the cellulose, thereafter reacting the resultant mixture with an esterifying bath containing an acid esterification catalyst, a lower fatty acid anhydride and an inert organic diluent which is a non-solvent for the primary fatty acid ester of a hydroxyalkyl cellulose thus produced, said inert diluent being present in amount such that the bath does not dissolve said primary ester, and separating said ester from the reaction mixture.

7. Process for producing an organic acid ester of an hydroxyalkyl cellulose, which comprises pretreating a dry hydroxyalkyl cellulose derived from unmercerized cellulose with an organic acid anhydride, in the absence of an esterification catalyst, thereafter esterifying the pretreated hydroxyalkyl cellulose with at least one organic acid anhydride in the presence of an esterification catalyst, and recovering the primary organic acid ester of a hydroxyalkyl cellulose thus produced.

8. Process for producing an organic acid ester of an hydroxyalkyl cellulose, which comprises pretreating a dry hydroxyalkyl cellulose derived from unmercerized cellulose with an organic acid anhydride, in the absence of an added esterification catalyst, esterifying the thus pretreated hydroxyalkyl cellulose by addition of an esterification catalyst in the presence of an inert organic non-solvent for the primary ester of a hydroxyalkyl cellulose thus produced, thereby maintaining the latter in fibrous form, and separately recovering the latter.

9. Process for producing from unmercerized cellulose an organic acid ester of an hydroxyalkyl cellulose in fibrous form, which comprises hydroxyalkylating an unmercerized cellulose to form a fibrous hydroxyalkyl cellulose containing at least 7% of combined alkylene oxide based on the cellulose, drying the fibrous hydroxyalkyl cellulose thus formed to a moisture content of not over 3%, treating the dried product with a lower fatty acid anhydride in the absence of an esterification catalyst and water, thereafter esterifying the pretreated fibrous hydroxyalkyl cellulose in a bath containing a lower fatty acid anhydride, an acid esterification catalyst and at least one non-solvent diluent for the resultant primary ester of hydroxyalkyl cellulose, the said non-solvent diluent being present in amount sufficient to prevent solution of the fibrous primary ester in the esterification bath, and separately recovering the said fibrous primary ester.

10. Process as defined in claim 9 wherein the hydroxyalkyl cellulose contains between 7% and 30% of a combined alkylene oxide, based on the weight of the cellulose.

11. Process for preparing an organic acid ester of an hydroxylalkyl cellulose in fibrous form, which comprises intimately mixing a dry hydroxyalkyl cellulose, derived from unmercerized cellulose, and a lower fatty acid anhydride, in the absence of an added esterification catalyst, thereby minimizing acetolysis of the hydroxyalkyl cellulose while initiating superficial acetylation in the absence of an esterification catalyst, thereafter esterifying the pre-treated hydroxyalkyl cellulose by intimately mixing the latter with an acidic esterification catalyst dispersed in a liquid which is a non-solvent for the fibrous primary ester of hydroxyalkyl cellulose thus produced, and separately recovering the latter.

12. Process as defined in claim 11, wherein the dispersion liquid comprises a lower fatty acid anhydride.

13. Process as defined in claim 11 wherein the dispersion liquid is inert to the reactants.

14. Process for producing an organic acid ester of an hydroxyalkyl cellulose, which comprises partially esterifying an hydroxyalkyl cellulose with at least one lower fatty acid anhydride, in the absence of an esterification catalyst, thereby producing a partially esterified product resistant to acetolysis, and thereafter completing esterification of the hydroxyalkyl cellulose in the presence of an esterification catalyst, and recovering from the reaction mixture the resultant primary ester.

15. Process for producing an organic acid ester of an hydroxyalkyl cellulose, which comprises pretially esterifying, by means of at least one fatty acid anhydride, an hydroxyalkyl cellulose in the absence of an organic acid and of an esterification catalyst, thereby producing a partially esterified product resistant to acetolysis, and thereafter completing esterification of the hydroxyalkyl cellulose by means of a fatty acid anhydride, in the presence of an esterification catalyst, and recovering from the reaction mixture the resultant primary ester.

16. Process for producing an acetic acid ester of an hydrovyalkyl cellulose, which comprises pretreating a dry hydroxyalkyl cellulose, derived from unmercerized cellulose, with acetic anhydride, in the absence of an esterification catalyst, reacting the resultant mixture with an esterifying bath containing an esterification catalyst and acetic anhydride, and separating from the reaction mixture the ester thus produced.

17. Process for producing an acetic acid ester of an hydroxyalkyl cellulose, which comprises pretreating a dry fibrous hydroxyalkyl cellulose with acetic anhydride, in the absence of added esterification catalyst, esterifying the thus pretreated hydroxyalkyl cellulose by addition of an esterification catalyst in the presence of an inert organic diluent for the anhydride and catalyst, and which liquid is a non-solvent for the primary acetate ester of an hydroxyalkyl cellulose thus produced, thereby maintaining the latter in fibrous form, and separately recovering the latter.

18. Process for preparing an acetate ester of an hydroxyalkyl cellulose in fibrous form, which comprises intimately mixing a dry fibrous hydroxyalkyl cellulose and acetic anhydride, in the absence of an added esterification catalyst, thereby initiating superficial acetylation of the hydroxyalkyl cellulose in the absence of an esterification catalyst and minimizing acetolysis of the hydroxyalkyl cellulose, thereafter esterifying the pretreated hydroxyalkyl cellulose by intimately mixing the latter with an esterification catalyst dispersed in a liquid diluent for the acetic anhydride and catalyst, and which is a non-solvent for the fibrous primary acetic acid ester of hydroxyalkyl cellulose thus produced, and separately recovering the latter.

AUBREY E. BRODERICK.

CERTIFICATE OF CORRECTION.

Patent No. 2,330,263.　　　　　　　　　　　　　　　　September 28, 1943.

AUBREY E. BRODERICK.

It is hereby certified that error appears in the printed specification of the above numbered patent requiring correction as follows: Page 4, second column, line 21, claim 5, for "celllulose" read --cellulose--; line 59, claim 7, before the word "with" insert --for at least several hours--; line 71, after "anhydride," insert --at a temperature within the range between about 20° C. and about 60° C.,--; page 5, first column, line 17-18, claim 9, for "esterifiication" read --esterification--; line 27, claim 10, strike out "a" before "combined"; line 31, claim 11, after "mixing" insert --and steeping for at least several hours--; line 51, claim 14, after "cellulose" insert --derived from unmercerized cellulose--; line 52, same claim, after "anhydride," insert --at a temperature within the range between about 20° C. and about 60° C.,--; and second column, line 6-7, claim 15, for "pretially" read --partially--; line 7, same claim, before "by" insert --at a temperature within the range between about 20° C. and about 60° C.,--; line 10, same claim 15, before "thereby" insert --said hydroxyalkyl cellulose being derived from an unmercerized cellulose,--; line 18, claim 16, for "hydrovyalkyl" read --hydroxyalkyl--; line 21, same claim, and line 29, claim 17, before "in" insert --for at least several hours,--; same page and column, lines 28 and 41, claims 17 and 18 respectively, after "cellulose" insert --derived from unmercerized cellulose--; and that the said Letters Patent should be read with this correction therein that the same may conform to the record of the case in the Patent Office.

Signed and sealed this 23rd day of November, A. D. 1943.

(Seal)　　　　　　　　　　　　　　　　　　　　　　　　Henry Van Arsdale,
　　　　　　　　　　　　　　　　　　　　　　　Acting Commissioner of Patents.